(12) United States Patent
Miles et al.

(10) Patent No.: US 11,536,213 B2
(45) Date of Patent: Dec. 27, 2022

(54) ENGINE SYSTEM WITH ELECTRIFIED AIR SYSTEM COMPONENTS FOR MANAGING EMISSIONS OF NITROGEN OXIDES IN A WORK VEHICLE

(71) Applicant: Deere & Company, Moline, IL (US)

(72) Inventors: Scott R. Miles, Cedar Falls, IA (US); Danan Dou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/324,388

(22) Filed: May 19, 2021

(65) Prior Publication Data
US 2022/0372927 A1 Nov. 24, 2022

(51) Int. Cl.
*F02D 41/14* (2006.01)
*F02B 39/10* (2006.01)
(Continued)

(52) U.S. Cl.
CPC ........ *F02D 41/1454* (2013.01); *F02B 37/004* (2013.01); *F02B 37/013* (2013.01);
(Continued)

(58) Field of Classification Search
CPC ........ F02B 37/04; F02B 37/24; F02B 37/183; F02B 37/004; F02B 37/013; F02B 39/10;
(Continued)

(56) References Cited

U.S. PATENT DOCUMENTS 6,062,026 A * 5/2000 Woollenweber ....... F02M 26/08
60/605.2
6,138,649 A 10/2000 Khair et al.
(Continued)

FOREIGN PATENT DOCUMENTS

DE 9421145 U1 5/1995
DE 102006015390 A1 10/2007
(Continued)

OTHER PUBLICATIONS

USPTO Non-Final Office Action issued in Utility U.S. Appl. No. 17/237,876 dated Jan. 21, 2022.
(Continued)

*Primary Examiner* — Ngoc T Nguyen
(74) *Attorney, Agent, or Firm* — Klintworth & Rozenblat IP LLP

(57) ABSTRACT

An engine system includes an engine with an intake manifold and an exhaust manifold, a turbocharger including a turbine in communication with the exhaust manifold and a compressor in communication with the intake manifold, and a regulator configured to control a flow of exhaust gas through the turbine. A controller of the engine system is operably connected with the regulator and is configured to monitor an engine load and an exhaust gas temperature during operation of the engine, identify a proscribed engine NOx emissions level based on the engine load and the exhaust gas temperature and, when the proscribed engine NOx emissions level is identified, modify the flow of exhaust gas through the turbine to reduce the energy extracted from the exhaust gas by the turbine and reduce a drive power provided to the compressor, thereby reducing a flow of intake air provided to the intake manifold by the compressor.

20 Claims, 7 Drawing Sheets

(51) Int. Cl.
  *F02B 37/18* (2006.01)
  *F02B 37/013* (2006.01)
  *F02B 37/24* (2006.01)
  *F02M 35/10* (2006.01)
  *F02D 41/00* (2006.01)
  *F02M 26/08* (2016.01)
  *F02M 26/13* (2016.01)
  *F02B 37/00* (2006.01)
  *F02M 26/05* (2016.01)

(52) U.S. Cl.
  CPC ............ *F02B 37/183* (2013.01); *F02B 37/24* (2013.01); *F02B 39/10* (2013.01); *F02D 41/0007* (2013.01); *F02D 41/146* (2013.01); *F02D 41/1446* (2013.01); *F02M 26/05* (2016.02); *F02M 26/08* (2016.02); *F02M 26/13* (2016.02); *F02M 35/10157* (2013.01); *F02D 2200/08* (2013.01); *F02D 2200/101* (2013.01); *F02D 2200/1002* (2013.01)

(58) Field of Classification Search
  CPC ...... F02M 26/05; F02M 26/08; F02D 41/146; F02D 41/1446; F02D 41/1454; F02D 2200/1002; F02D 2200/108; F02D 2200/08; F02D 2200/101
  See application file for complete search history.

(56) References Cited

U.S. PATENT DOCUMENTS

| | | | |
|---|---|---|---|
| 6,647,724 | B1 | 11/2003 | Arnold et al. |
| 8,176,736 | B2 | 5/2012 | Janssen |
| 8,181,452 | B2 | 5/2012 | Bidner et al. |
| 8,522,756 | B2 | 9/2013 | Vuk et al. |
| 8,820,056 | B2 | 9/2014 | VanDyne et al. |
| 9,347,365 | B2 | 5/2016 | Hunter |
| 9,540,989 | B2 | 1/2017 | Sanchez Perez et al. |
| 9,869,258 | B2 | 1/2018 | Dion |
| 10,145,320 | B1 | 12/2018 | Zeng et al. |
| 10,641,191 | B2 | 5/2020 | Zeng et al. |
| 11,205,789 | B2 | 12/2021 | Tanimoto |
| 2008/0092861 | A1 | 4/2008 | Duffy et al. |
| 2009/0107142 | A1 | 4/2009 | Russell et al. |
| 2010/0018203 | A1 | 1/2010 | Richards |
| 2010/0146968 | A1 | 6/2010 | Simpson et al. |
| 2011/0016862 | A1 | 1/2011 | Song et al. |
| 2011/0209473 | A1 | 9/2011 | Fritz et al. |
| 2013/0098030 | A1 | 4/2013 | Freund et al. |
| 2013/0297126 | A1 | 11/2013 | Yamazaki et al. |
| 2014/0109571 | A1 | 4/2014 | Primus et al. |
| 2016/0010576 | A1 | 1/2016 | Primus et al. |
| 2016/0265468 | A1* | 9/2016 | Takayanagi ......... F02D 41/1401 |
| 2019/0107066 | A1 | 4/2019 | Kurtz et al. |
| 2019/0383244 | A1 | 12/2019 | Kim |
| 2020/0011229 | A1 | 1/2020 | Waldron et al. |
| 2020/0173354 | A1 | 6/2020 | Punjani et al. |
| 2020/0309059 | A1 | 10/2020 | Hotta et al. |
| 2021/0277849 | A1 | 9/2021 | Rahm et al. |
| 2022/0090566 | A1 | 3/2022 | Magnusson et al. |
| 2022/0106919 | A1 | 4/2022 | Andersson et al. |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 804124 | 11/1958 |
| JP | 09268916 A1 | 10/1997 |
| JP | 2001073880 A1 | 3/2001 |
| JP | 2006057570 A | 3/2006 |
| JP | 4788531 B2 | 10/2011 |
| KR | 101999909 B1 | 7/2019 |
| RU | 2719758 C2 | 4/2020 |
| WO | 2013068800 A1 | 5/2013 |
| WO | 2013186373 A1 | 12/2013 |
| WO | 2019219701 A1 | 11/2019 |
| WO | 2020064679 A1 | 4/2020 |
| WO | 2021005613 A1 | 1/2021 |

OTHER PUBLICATIONS

USPTO Final Office Action issued in Utility U.S. Appl. No. 17/237,876 dated Mar. 8, 2022.
USPTO Non-Final Office Action issued in Utility U.S. Appl. No. 17/308,331 dated on Jul. 21, 2022.
USPTO Final Office Action issued in Utility U.S. Appl. No. 17/358,587 dated Jul. 25, 2022. (17 pages).
Garrett Advancing Motion, 48V Electric Compressor for Mild Hybrid Vehicles, © 2021 Garrett Motion Inc. (9 pages).
Eaton, Diesel Engine EGR Pump, Precision Air Flow, https://www.eaton.com/us/en-us/products/engine-solutions/superchargers/TVS-technology-applications/tvs-diesel-egr-pump.html, © 2021 Eaton. (5 pages).
Garrett Advancing Motion, E-Turbo Technology Accelerating Global Powertrain Electrification Trends Beginning with Mercedes-AMG, Media Pressroom—Press Releases, Jul. 22, 2020, © 2021 Garrett Motion Inc. (4 pages).
University Wisconsin, Electric Turbo Chargers, Overview of Forced Induction System, WEMPEC Electrification of FIS, EFIS Topologies, © Board of Regents of the University of Wisconsin System, Mar. 2016. (1 page).
Utility U.S. Appl. No. 17/237,876, filed Apr. 22, 2021.
Utility U.S. Appl. No. 17/306,604, filed May 3, 2021.
Utility U.S. Appl. No. 17/308,331, filed May 7, 2021.
Utility U.S. Appl. No. 17/319,256, filed May 13, 2021.
USPTO Non-Final Office Action issued in Utility U.S. Appl. No. 17/237,876 dated Aug. 31, 2021.
USPTO Non-Final Office Action issued in Utility U.S. Appl. No. 17/237,876 dated Aug. 16, 2022. (18 pages).
USPTO Non-Final Office Action issued in U.S. Appl. No. 17/306,604 dated Sep. 13, 2022. (13 pages).
USPTO Non-Final Office Action issued in U.S. Appl. No. 17/406,656 dated Sep. 15, 2022. (16 pages).

* cited by examiner

ENGINE SYSTEM WITH ELECTRIFIED AIR SYSTEM COMPONENTS FOR MANAGING EMISSIONS OF NITROGEN OXIDES IN A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to internal combustion engines and, more particularly, to engine systems having electrified air system components that operate to manage emissions of nitrogen oxides (NOx).

BACKGROUND OF THE DISCLOSURE

Diesel engine systems are used to power many work vehicles and are subject to emissions standards regarding an acceptable level of nitrogen oxides (NOx) emitted during operation. Existing diesel engine systems are capable of meeting not-to-exceed (NTE) emissions limits and testing requirements that cover a wide range of speed and load combinations commonly experienced in use; however, future emissions standards will likely reduce the regulated NOx limit and expand the speed and load operating range of the regulated or NTE emissions limits. Existing diesel engine systems may not be able to meet these enhanced NOx emissions restrictions due, at least in part, to the manner in which air system components in the engine system operate during low speed and low load engine operating conditions.

SUMMARY OF THE DISCLOSURE

An engine system including an engine having one or more piston-cylinder arrangements communicating with an intake manifold and an exhaust manifold, a turbocharger including a turbine in communication with the exhaust manifold and a compressor driven by the turbine and in communication with the intake manifold, and a regulator configured to control a flow of exhaust gas through the turbine. The engine system also includes a controller having a processor and memory architecture and that is operably connected with the regulator, the controller configured to monitor an engine load and an exhaust gas temperature during operation of the engine, identify a proscribed engine nitrogen oxides (NOx) emissions level based on the engine load and the exhaust gas temperature in which NOx emissions are within a proscribed range, and when the proscribed engine NOx emissions level is identified, control the regulator to modify the flow of exhaust gas through the turbine. Modifying the flow of exhaust gas through the turbine reduces an amount of energy extracted from the exhaust gas by the turbine and reduces a drive power provided to the compressor, thereby reducing a flow of intake air provided to the intake manifold by the compressor.

In another implementation, an engine system for a work vehicle includes an engine having one or more piston-cylinder arrangements communicating with an intake manifold and an exhaust manifold, a turbocharger including a turbine in communication with the exhaust manifold and a compressor driven by the turbine and in communication with the intake manifold, and a regulator configured to control a flow of exhaust gas through the turbine. The engine system also includes a controller having a processor and memory architecture and that is operably connected with the regulator, the controller configured to monitor an engine load and an exhaust gas temperature during operation of the engine, determine if the engine load and the exhaust gas temperature are below an engine load threshold and exhaust gas temperature threshold, respectively, thereby indicating a proscribed engine nitrogen oxide gas (NOx) emissions level, and when the engine load and the exhaust gas temperature are below the engine load and exhaust gas temperature thresholds, control the regulator to modify the flow of exhaust gas through the turbine. Modifying the flow of exhaust gas through the turbine reduces an amount of energy extracted from the exhaust gas by the turbine and reduces a drive power provided to the compressor, thereby reducing a flow of intake air provided to the intake manifold by the compressor.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
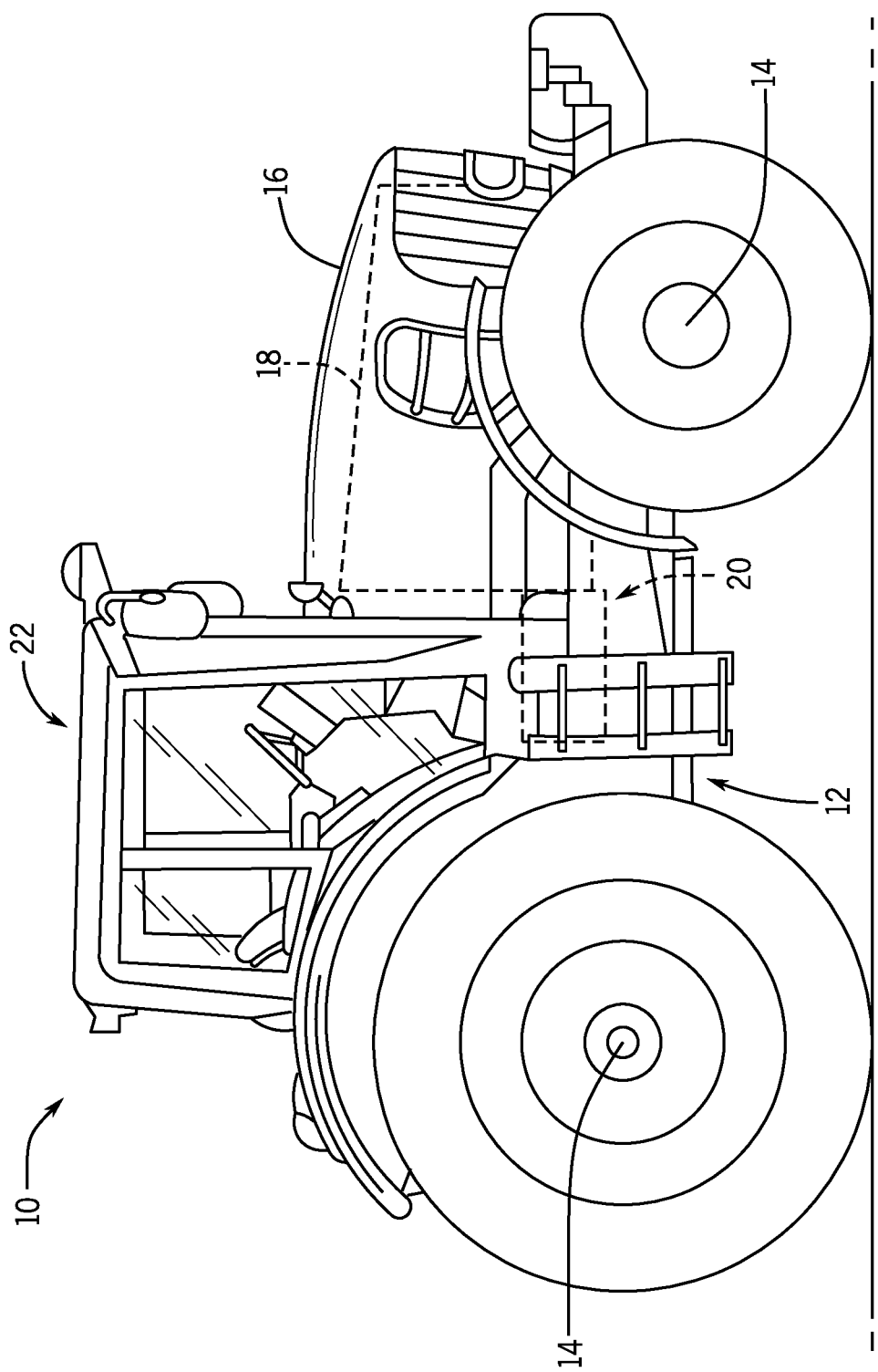
FIG. 1 is a simplified side view of an example work vehicle in which embodiments of the present disclosure may be implemented.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth in the appended claims.

Overview

Internal combustion engines, and more particularly diesel engines, are employed on many work vehicles and are operated under a wide variety of speed and load conditions. Such diesel engines are subject to emissions standards regarding an acceptable level of NOx emitted during operation thereof, with such standards covering a wide range of speed and load combinations commonly experienced in use, i.e., an "NTE region." While existing diesel engine systems are capable of meeting current emissions standards in this NTE region, future emissions standards will both reduce the acceptable NOx limit and expand the NTE region over which such a NOx limit is required. That is, overall acceptable level of NOx emissions will be lowered, potentially by a factor of 10 x, and the NTE region over which NOx emissions limits are regulated will likely be expanded to include low load and low speed engine operating conditions.

It is recognized that the structure and operation of air systems in existing diesel engine systems will not allow the engine systems to meet these future NOx emissions regulations over an expanded NTE region. First, the air systems in existing diesel engine systems do not recirculate enough exhaust gas (EGR) when the engine runs below current minimum NTE speed levels to significantly reduce engine NOx emissions. This is due to the pressure of the exhaust gas output from the engine being insufficiently higher than the pressure of the intake air supplied to the engine to create a positive pressure difference that allows for the flow of exhaust gas through the EGR system. Second, when the engine runs below current minimum NTE load levels, the air systems in existing diesel engine systems provide an air/fuel ratio that is higher than necessary, resulting in low exhaust temperature that, in turn, negatively impact the conversion efficiency of a selective catalyst reduction (SCR) treatment of the exhaust gas that would otherwise minimize tailpipe NOx emissions.

To minimize NOx emissions over an expanded NTE region and to an extent that will meet future emissions standards, an engine system is provided with electrified air system components that are selectively operable to better manage NOx emissions. Operation of the air system components can both increase EGR and improve SCR conversion efficiency, especially during low speed and low load engine operating conditions, such that NOx emissions can be reduced over an expanded NTE region.

According to embodiments, engine load and exhaust gas temperature are monitored during operation of the engine system to determine operating conditions in which engine NOx emissions levels may fall within a proscribed range. The engine load and exhaust gas temperature are compared to an engine load threshold and an exhaust gas temperature threshold, respectively, and when the engine load and the exhaust gas temperature are below their respective threshold levels, a proscribed engine NOx emissions level or condition is identified. Upon such identification, the engine system is operated to selectively control a flow of exhaust gas through one or more turbines of a turbocharger assembly to increase exhaust temperature and reduce boost. That is, modification of exhaust gas through the turbocharger turbine reduces the amount of energy extracted from the exhaust gas by the turbine, which maintains a higher temperature of the exhaust gas and provides for a higher conversion efficiency in an SCR treatment of the exhaust gas, so as to reduce NOx emissions. Additionally, by reducing the amount of energy extracted from the exhaust gas by the turbine, the turbocharger compressor is driven with a lower input power, such that the amount of intake air provided to the engine is reduced. The reduction in intake air provided to the engine lowers the air/fuel ratio in the engine and, in turn, reduces NOx emissions.

In one embodiment, an electrified wastegate is provided in the engine system to selectively divert exhaust gas from the turbine. A regulator is provided to control operation of the wastegate and thereby selectively modify the flow of exhaust gas to the turbine. When it is determined that NOx emissions are at proscribed engine NOx emissions level, the regulator may cause the wastegate to open, such that exhaust gas bypasses the turbine. By causing the flow of exhaust gas to bypass the turbine, the amount of energy extracted from the exhaust gas by the turbine is reduced and the level of NOx emissions can also be reduced.

In another embodiment, a variable geometry (VG) turbocharger is provided in the engine system that may be selectively configured to reduce the amount of energy extracted from the exhaust gas by the turbine. A regulator is provided that operates to adjust the aspect ratio of the turbine in the VG turbocharger and thereby selectively modify the flow of exhaust gas through the turbine. When it is determined that NOx emissions are a proscribed engine NOx emissions level, the regulator may cause the aspect ratio of the turbine to be adjusted in a manner that reduces the amount of energy extracted from the exhaust gas by the turbine, such that the level of NOx emissions is also reduced.

In one implementation, an electrified air-booster is included in the engine system that is selectively operable to boost intake air to the intake manifold when activated, so as to provide improved transient response in the engine system. The air-booster may be selectively operated based on a rate of change of the engine load, and when the engine load rate of change exceeds an associated engine load rate of change threshold, the electrified air-booster is activated. The air-booster may be provided as an e-compressor that includes a stand-alone compressor and an electrical machine that drives the stand-alone compressor. The air-booster may instead be provided as an electrical machine that is mechanically coupled to the turbocharger to drive a shaft that couples the turbine and the compressor, such that the turbocharger is configured as an e-turbocharger. For both the e-compressor and the e-turbocharger, the electrical machine operates to drive its associated compressor (either directly or via the turbocharger shaft) to cause the compressor to boost intake air to the intake manifold.

In another implementation, an exhaust gas recirculation (EGR) pump is included in the engine system that is selectively operable to recirculate a portion of exhaust gas output from the exhaust manifold back to the intake manifold. The EGR pump is operable to recirculate exhaust gas output from the exhaust manifold back to the intake manifold even when the engine speed is running at low speed, thereby reducing the level of NOx emissions from the engine.

Example embodiments of an engine system having electrified engine components that operate to boost engine torque will now be described in conjunction with FIGS. 1-7 according to this disclosure. By way of non-limiting examples, the following describes the engine system as being incorporated into a work vehicle and as including a turbocharger assembly that includes series-connected high pressure and low-pressure turbochargers for boosting airflow to the internal combustion engine. The following examples notwithstanding, alternative work vehicles and engine systems having turbocharger assemblies of other constructions would also benefit from electrified air system components being incorporated therein according to aspects of the invention. It is therefore recognized that aspects of the invention are not meant to be limited only to the specific embodiments described hereafter.

Example Embodiments Of Engine Systems With Electrified Air System Components For Managing Emissions Of Nitrogen Oxides In A Work Vehicle According to embodiments, an engine system is disclosed that includes electrified air system components that operate to manage NOx emissions during operation of the engine system. As will become apparent to those skilled in the art from the following description, the engine system finds particular applicability in work vehicles whose NOx emissions are regulated, and therefore the illustrative examples discussed herein utilize such an environment to aid in the understanding of the invention.

Referring initially to FIG. 1, a work vehicle 10 is shown that can implement embodiments of the invention. In the illustrated example, the work vehicle 10 is depicted as an agricultural tractor. It will be understood, however, that other configurations may be possible, including configurations with the work vehicle 10 as a different kind of tractor, a harvester, a log skidder, a grader, a backhoe loader, or one of various other work vehicle types. The work vehicle 10 includes a chassis or frame 12 carried on front and rear wheels 14. Positioned on a forward end region of the chassis 12 is a casing 16 within which is located an engine system 18. The engine system 18 provides power via an associated powertrain 20 to an output member (e.g., an output shaft, not shown) that, in turn, transmits power to axle(s) of the work vehicle 10 to provide propulsion thereto and/or to a power take-off shaft for powering an implement on or associated with the work vehicle 10, for example.

An operator controls the functions of the work vehicle 10, including the engine system 18, powertrain 20, and implement(s) on/associated with the work vehicle 10, from an operator station 22 in the work vehicle. While not shown in FIG. 1, it is recognized that the operator station 22 may include a human-machine interface and various controls therein configured to receive input commands from the operator to control, for example, various electric or hydraulic systems associated with controlling the aforementioned components. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

Figure 2:
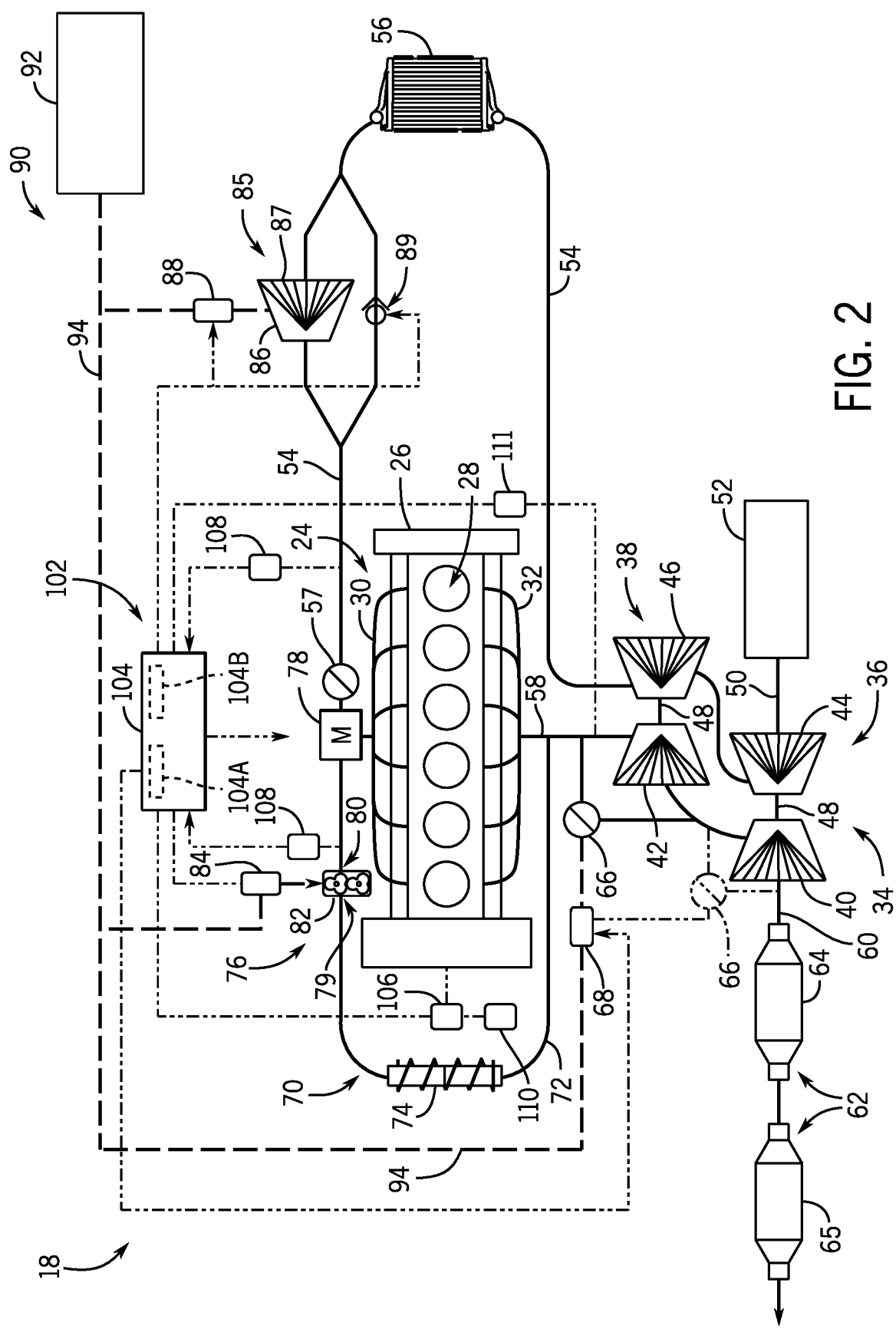
FIG. 2 is a schematic diagram of an example engine system having electrified air system components for managing NOx emissions in accordance with an embodiment.

Referring now to FIG. 2, various components of an example engine system 18 that may be included on the work vehicle 10 are depicted in accordance with an example implementation. The engine system 18 includes an internal combustion engine 24 (hereafter, "engine") in the form of a diesel-powered engine, although it is recognized that the engine 24 could also be run on other liquid fuels such as gasoline or ethanol. The engine 24 of the engine system 18 includes an engine block 26 having a piston-cylinder arrangement 28 therein operable to cause combustion events. In the illustrated implementation, the engine 24 is an inline-6 (I-6) engine; however, in alternative implementations various engine styles and layouts may be used.

The engine system 18 also includes an intake manifold 30 fluidly connected to the engine 24, an exhaust manifold 32 fluidly connected to the engine 24, and a turbocharger assembly 34. In the illustrated embodiment, the turbocharger assembly 34 includes a pair of series-connected turbochargers 36, 38 fluidly connected to and in operable communication with the intake manifold 30 and the exhaust manifold 32, although it is recognized that in other embodiments the engine system 18 could instead include only a single turbocharger. As shown in FIG. 2, the turbocharger assembly 34 includes a low-pressure (LP) turbocharger 36 and a high-pressure (HP) turbocharger 38 arranged in series—with each of the turbochargers 36, 38 including a turbine 40, 42 and a compressor 44, 46 mechanically connected via a rotatable shaft 48. In operation of each of the turbochargers 36, 38, exhaust gas flowing through the turbine 40, 42 causes the turbine to rotate, thereby causing the shaft 48 to rotate. Rotation of the shaft 48, in turn, causes the compressor 44, 46, to also rotate, which draws additional air into the compressors 44, 46 to thereby increase or boost the flow rate of air to the intake manifold 30 above what it would otherwise be without the turbochargers 36, 38, and in this manner the turbochargers 36, 38 supply so-called "charge" air to the engine 24.

As indicated, the HP and LP turbochargers 38, 36 are arranged in series with one another. The HP turbocharger 38 features a turbine 42 (HP turbine) for receiving exhaust gas from the exhaust manifold 32, and a compressor 46 (HP compressor) coupled to the HP turbine 42 for delivering pressurized air to the intake manifold 30 for combustion. The LP turbocharger 36 features a turbine 40 (LP turbine) for receiving exhaust gas from the HP turbine 42, and a compressor 44 (LP compressor) coupled to the LP turbine 40 for delivering pressurized air to the HP compressor 46 for further pressurization. Both the LP and HP turbochargers 36, 38 function to recover a portion of heat energy from the exhaust gas with their respective turbines 40, 42, to drive their respective compressors 44, 46 and thereby boost the amount of charge air delivered to the engine 24 for combustion.

As shown in FIG. 2, the intake manifold 30 is in fluid communication with the piston-cylinder arrangement 28 to direct a supply of air thereto. Fresh air is provided to the intake manifold 30 from the ambient environment via a fresh air intake passageway 50. Fresh air is drawn into the fresh air intake passageway 50, passed through an air filter 52 disposed in-line with the fresh air intake passageway 50, and provided to the LP compressor 44. The LP compressor 44 performs a first compression to the fresh air and provides it to the HP compressor 46 via a charge air passageway 54. The charge air passageway 54 then runs from the HP compressor 46 to the intake manifold 30 to provide compressed charge air from the HP compressor 46, with a charge air cooler 56 (i.e., aftercooler) positioned in-line with the charge air passageway 54 that reduces the temperature of the charge air prior to it being provided to the engine 24, to increase the unit mass per unit volume (i.e., density) of the charge air for improved volumetric efficiency and higher power output. In one embodiment, an air throttle 57 is also positioned in the charge air passageway 54 to regulate the amount of compressed charge air provided to the intake manifold 30.

The exhaust manifold 32 of the engine system 18 is fluidly coupled to inlets of the turbines 40, 42 of the turbochargers 36, 38 via an exhaust gas passageway 58, with fluid outlets of the turbines 40, 42 then fluidly coupled to the ambient environment via a vent passageway 60. Exhaust gas produced by the engine 24 is directed out from the exhaust manifold 32 and passes through the exhaust gas passageway 58 to the turbines 40, 42, with the exhaust gas then exiting the turbines 40, 42 to the ambient environment via the vent passageway 60 in a conventional manner. An aftertreatment system 62 is disposed in-line with the vent passageway 60 to treat the exhaust gas prior to the exhaust gas being vented to the ambient environment. The aftertreatment system 62 may include one or more components or devices that treat the exhaust gas, such as a diesel particulate filtration (DPF) device 64 and a selective catalyst reduction (SCR) device 65, as illustrated in FIG. 2. As will be explained in greater detail below, the SCR device 65 has a high SCR conversion efficiency (to reduce NOx) when provided with exhaust gas at a sufficiently high temperature, and thus it is desirable to maintain the temperature of the exhaust gas provided to the SCR device 65 above a certain temperature threshold.

Components for modifying the flow of exhaust gas through the turbocharger assembly 34—more particularly to the HP turbine 42 or both the HP and LP turbines 40, 42—are further provided in the engine system 18, with it understood that modifying the flow of exhaust gas through the turbocharger assembly 34 refers to modifying the flow of exhaust provided to the turbine(s) and/or to modifying the flow area of the turbine(s), with both embodiments impacting the amount of energy extracted from the exhaust gas. In the embodiment of FIG. 2, these components are provided in the form of an electronic wastegate 66 (i.e., "e-wastegate") and associated regulator 68 that are selectively operable to modify the flow of exhaust gas provided to the HP turbine 42. It is also recognized that a similar e-wastegate 66 could be provided for the LP turbine 40 (as shown in phantom in FIG. 2), and thus the following discussion regarding operation/controls of the e-wastegate 66 as pertains to modifying the flow of exhaust gas provided to the HP turbine 42 is to be understood as also describing modifying the flow of exhaust gas provided to the LP turbine 40 in one embodiment.

The e-wastegate 66 may be provided as an electronically controlled valve that is actuatable between open and closed states to selectively allow exhaust gas to bypass the HP turbine 42 and be routed directly into the downstream exhaust gas. The e-wastegate 66 may be either internal to or external from the HP turbocharger 38, according to various implementations. The regulator 68 operates to control the electrical power provided to the e-wastegate 66 to thereby cause the e-wastegate 66 to operate in its open or closed state or at a position in between the open and closed states (e.g., 10% open). By selectively passing exhaust gas through the HP turbine 42 or bypassing the exhaust gas around the HP turbine 42, the e-wastegate 66 is able to therefore control the amount of power the HP turbine is able to generate for driving the HP compressor 46 via the extraction of energy from the exhaust gas as it passes through the HP turbine 42. Similarly, as indicated above, an e-wastegate 66 can also be provided to selectively pass exhaust gas through the LP turbine 40 or bypass the exhaust gas around the LP turbine 40 to control the amount of power the LP turbine is able to generate for driving the LP compressor 44 via the extraction of energy from the exhaust gas as it passes through the LP turbine 40.

An exhaust gas recirculation (EGR) system 70 is further provided in the engine system 18 that functions to recirculate a portion of the exhaust gas generated by the engine 24 and thereby reduce the formation of NOx during combustion. Exhaust gas is drawn from the exhaust manifold 32 and recirculated into the intake manifold 30 via the EGR system 70. The EGR system 70 includes an EGR passageway 72, an EGR cooler 74, an EGR pump 76, and an EGR mixer 78. The EGR passageway 72 draws in a portion of the exhaust gas that is flowing within the exhaust gas passageway 58 for circulation through the EGR system 70. The EGR cooler 74 is disposed in-line with the EGR passageway 72 for the purpose of cooling the exhaust gas flowing through the EGR passageway 72. Exhaust gas flows to the EGR pump 76, with the EGR pump 76 having an inlet side 79 in fluid communication with the exhaust manifold 32 and an outlet side 80 in fluid communication with the intake manifold 30. The EGR pump 76 may be a positive-displacement type compressor capable of delivering physically metered air flow rates, such as a roots, screw, scroll, or vane compressor, or alternatively may be a radial-type compressor similar to a turbocharger compressor. In one embodiment, the EGR pump 76 is constructed to include rotors 82 driven by an electric motor 84. The EGR pump 76 may be electrically controlled to selectively control the flow of exhaust gas recirculated from the exhaust gas passageway 58 to the engine 24 via the EGR passageway 72, including cutting off the flow of exhaust gas therethrough and selectively restricting or controlling the flow of exhaust gas therethrough by a desired amount. Exhaust gas that is pumped by the EGR pump 76 is provided to the EGR mixer 78, which intermixes the exhaust gas with the charge air provided from the charge air passageway 54 for introduction to the intake manifold 30, by which the mixed exhaust gas and charge air is then fed to the engine 24. In other implementations, a dedicated EGR mixer 78 may not be included in the engine system 18, with exhaust gas instead being introduced to induction piping of the engine 24 and/or the intake manifold 30 for mixing with the charge air.

As shown in FIG. 2, the engine system 18 further includes an air-booster 85 that functions to boost the amount of intake or charge air provided to the engine 24. In the illustrated example, the air-booster 85 is an electrical compressor 86 (hereafter "e-compressor") that includes a compressor 87 driven by an electrical machine 88 (i.e., electric motor). The e-compressor 86 is provided as a stand-alone component that is separate from the turbocharger assembly 34 and may be positioned in any of a number of locations relative to the turbocharger assembly 34. In the illustrated example, the e-compressor 86 is positioned downstream of the charge air cooler 56, but it is recognized that the e-compressor 86 could instead be positioned upstream of the compressors 44, 46 of the turbocharger assembly 34, between the compressors 44, 46, between the HP compressor 46 and the charge air cooler 56, or downstream of the EGR mixer 78. When activated, the electrical machine 88 receives an input power and, responsive thereto, drives the compressor 87 to provide a boosted flow of charge air to the engine 24. During periods where the e-compressor 86 is not operating, intake air may bypass the e-compressor 86 via a bypass valve 89 of the air-booster 85 arranged in parallel with the e-compressor 86. The bypass valve 89 may be a mechanically or electrically activated valve that is operated in connection with the e-compressor 86 to control the flow of intake air therethrough.

For providing electrical power to the e-wastegate 66, the EGR pump 76, and the e-compressor 86, an electrical system 90 is provided in the engine system 18 that may include one or more energy storage devices, inverters, converters, wiring, and other electric components. In one example, the electrical system 90 includes an energy storage device 92 in the form of a lithium-ion battery, although other high-voltage or high-power energy storage devices may instead by employed, such as other battery types, an ultracapacitor, or a combination of ultracapacitors, and/or batteries, as examples. The energy storage device 92 provides DC power to a DC-to-DC converter (not shown) that outputs power to a DC bus 94, with the DC bus 94 providing power to multiple devices, outlets, etc. in the engine system 18, including the e-wastegate 66, the EGR pump 76, and the e-compressor 86. In one implementation, the electrical system 90 is configured to provide 36 V power or greater, e.g., a 48 V system, that in combination with engine 24, forms a "mild-hybrid" engine system for the work vehicle 10 (FIG. 1).

As illustrated in FIG. 2, the engine system 18 includes a control system 102, which includes a controller 104 or electronic control unit (ECU). The controller 104 includes a processor 104a and memory 104b. The processor 104a performs the computation and control functions of the controller 104 and may comprise any type of processor or multiple processors, single integrated circuits such as a microprocessor, or any suitable number of integrated circuit devices and/or circuit boards working in cooperation to accomplish the functions of a processing unit. During operation, the processor 104a executes one or more programs which may be contained within the memory 104b and, as such, controls the general operation of the controller 104 and the computer system of the controller 104 in executing the functions described herein. In the depicted embodiment, the memory 104b stores the above-referenced program(s).

Generally, the controller 104, is used to provide at least some of the engine system operations and functions described herein and, in particular, controls operation of the e-wastegate 66, the air-booster 85, and the EGR pump 76. In general, the controller 104 is operably connected with: the engine 24; the EGR pump 76; the e-compressor 86; the e-wastegate 66; an engine speed sensor 106; sensor(s) 108 that may include any or all of mass airflow, temperature, and pressure sensors in the intake manifold 30, charge air passageway 54, or EGR passageway 72; a fuel sensor 110; and an exhaust gas temperature sensor 111. While sensors 106, 108, 110, 111 are shown in FIG. 2 as separate, dedicated sensors, it is recognized that sensing capabilities for measuring some parameters may be built-in to components of the engine system 18. The controller 104 may also be coupled with other devices necessary to provide the desired system control functions, including various other actuators and sensors. The controller 104 receives inputs from the various sensors that generate signals in proportion to various physical parameters associated with various components in the engine system 18 and any other sources. In some embodiments, the controller 104 may be configured to provide other functionality of the work vehicle 10 in addition to the control functions disclosed herein.

The controller 104 operates to control the engine system 18 (and engine 24) in various control modes, with the controller 104 operating the engine in the different modes based on inputs received thereby that may include sensor inputs and/or operator command inputs. The different operational modes can include an engine start-up mode, an engine stop/start mode, a cold engine mode, a boost mode, and a low load engine emissions control mode (hereafter "emissions control mode," with it recognized that emissions are controlled, at least in some manner, during any/all modes of engine operation), as examples, and the controller 104 may output control signals to one or more components in the engine system 18 to control operation of the engine system 18 in a specific mode.

According to an embodiment, in operating the engine system 18 to control emissions specifically when the engine 24 is operating at a low load, the controller 104 is configured to selectively operate the e-wastegate 66 in a manner that limits NOx emissions from the engine system 18. The controller 104 may cause the engine system 18 to operate in the emissions control mode of operation when the controller 104 determines or identifies that NOx emissions may be reaching a proscribed level (i.e., above an acceptable emissions level), with the controller 104 receiving inputs on the engine load (as determined by air flow and fuel requested/required, for example) and rate of change of the engine load, exhaust gas temperature, and engine speed to determine whether the NOx emissions may be at a proscribed level in the current operating condition of the engine system 18. That is, it is recognized that operation of the engine 24 at a low engine load can result in increases in the NOx emissions level of the engine system 18, which may be due to an increase in the air/fuel ratio in the engine 24 during low load operation (resulting in lower exhaust gas temperatures and a reduced conversion efficiency in the aftertreatment system 62, i.e., SCR device 65). Accordingly, the controller 104 controls operation of the e-wastegate 66 upon entering into emissions control mode in order to reduce NOx emissions from the engine system 18.

When it is determined by the controller 104 that the engine load and the exhaust gas temperature values have fallen below respective pre-determined engine load and exhaust gas temperature thresholds (or that a rate of change of the engine load (dropping) is such that an engine load below the engine load threshold is imminent), the controller 104 causes the engine system 18 to operate in emissions control mode, as such values are indicative of NOx emissions levels being at a proscribed level. In the emissions control mode of operation at a low load, the controller 104 causes power to be provided from the energy storage device 92 to the regulator 68 and e-wastegate 66 (such as via the DC bus 94), with the regulator 68 then controlling voltage/current provided to the e-wastegate 66 to cause the e-wastegate 66 to open (to a fully open or substantially open position). Upon opening the e-wastegate 66, the flow of exhaust gas to the HP turbine 42 is modified—with the exhaust gas flowing through the e-wastegate 66 and bypassing the HP turbine 42 when the e-wastegate 66 is operated in its open (or substantially open) condition. In bypassing the HP turbine 42, the amount of energy extracted from the exhaust gas by the HP turbine 42 is reduced or possibly eliminated. This allows for the exhaust gas to retain more thermal energy, such that the exhaust gas subsequently passes to the aftertreatment system 62 (i.e., to the SCR device 65) at a higher temperature that enables the SCR device 65 to perform NOx treatment at a higher conversion efficiency. Additionally, by reducing or eliminating the extraction of energy from the exhaust gas by the HP turbine 42, the power for driving the HP compressor 46 is lowered, such that the HP compressor 46 outputs less charge air to the intake manifold 30. This results in a lower air/fuel ratio in the engine 24, which also serves to lower the level of NOx emissions generated by the engine system 18.

In combination with controlling the e-wastegate 66 during the emissions control mode of operation, the controller 104 also controls operation of the EGR pump 76 during ongoing operation of the engine system 18, both when operating in the emissions control mode and when operating in other modes. The EGR pump 76 operates to recirculate exhaust gas output from the exhaust manifold 32 back to the intake manifold 30 after mixing with charge air, thereby reducing the level of NOx emissions from the engine 24. Of particular benefit, the EGR pump 76 is operable to recirculate exhaust gas even at low engine speeds (as compared to systems that include an EGR valve rather than a pump), such that the operating range of the engine system 18 over which NOx emissions can be managed is expanded.

The air-booster 85 is also selectively operated by the controller 104 and can be tied to operation of the e-wastegate 66, in one implementation. That is, the controller 104 may determine that a rate of change of the engine load is increasing at such a level that necessitates activation of the air-booster 85 to improve transient response of the engine 24. When the engine 24 is increasing quickly from a low load condition to a high load condition during transient operation, activation of the air-booster 85 enables the engine system 18 to maintain responsiveness by boosting the flow of charge air provided to the engine 24. In such conditions, the engine system 18 exits out of the emissions control mode, with the controller 104 (and regulator 68) causing the e-wastegate 66 to actuate to the closed position (or substantially closed). At the same time, the controller 104 causes power to be provided from the energy storage device 92 to the e-compressor 86, such that the electrical machine 88 receives power (from the DC bus 94, for example) and drives the compressor 87 accordingly, thereby boosting the intake charge air to the engine 24 and providing a corresponding boost in torque output by the engine 24 (when accompanied by an increased fuel flow provided to the engine 24). Additionally, the bypass valve 89 is caused to close to direct air through the e-compressor 86.

Accordingly, based on the monitoring of operational parameters of the engine system 18—including the engine load, rate of change of the engine load, exhaust gas temperature, and engine speed—the controller 104 is able to determine an appropriate operational mode of the engine system 18 and switch between operational modes as necessary. Based on those monitored operational parameters, the controller 104 can cause the engine system 18 to transition into the emissions control mode, where the e-wastegate 66 is selectively operated in a manner that limits NOx emissions from the engine system 18—i.e., the e-wastegate 66 is opened (to a fully open or substantially open position). Also based on those monitored operational parameters, the controller 104 can cause the engine system 18 to transition out of the emissions control mode, where the e-wastegate 66 is closed (or substantially closed) and the e-compressor 86 is activated to provide a boost of charge air to the intake manifold 30 to improve engine responsiveness to the increasing load—i.e., closing of the e-wastegate 66 is synced with activation/starting of the e-compressor 86 to provide a double benefit to transient response of the engine 24. Additionally, the EGR pump 76 allows for further NOx emissions reductions over a broad operating range of the engine system 18, as the EGR pump 76 provides EGR even when the engine 24 is run at a low speed.

Figure 3:
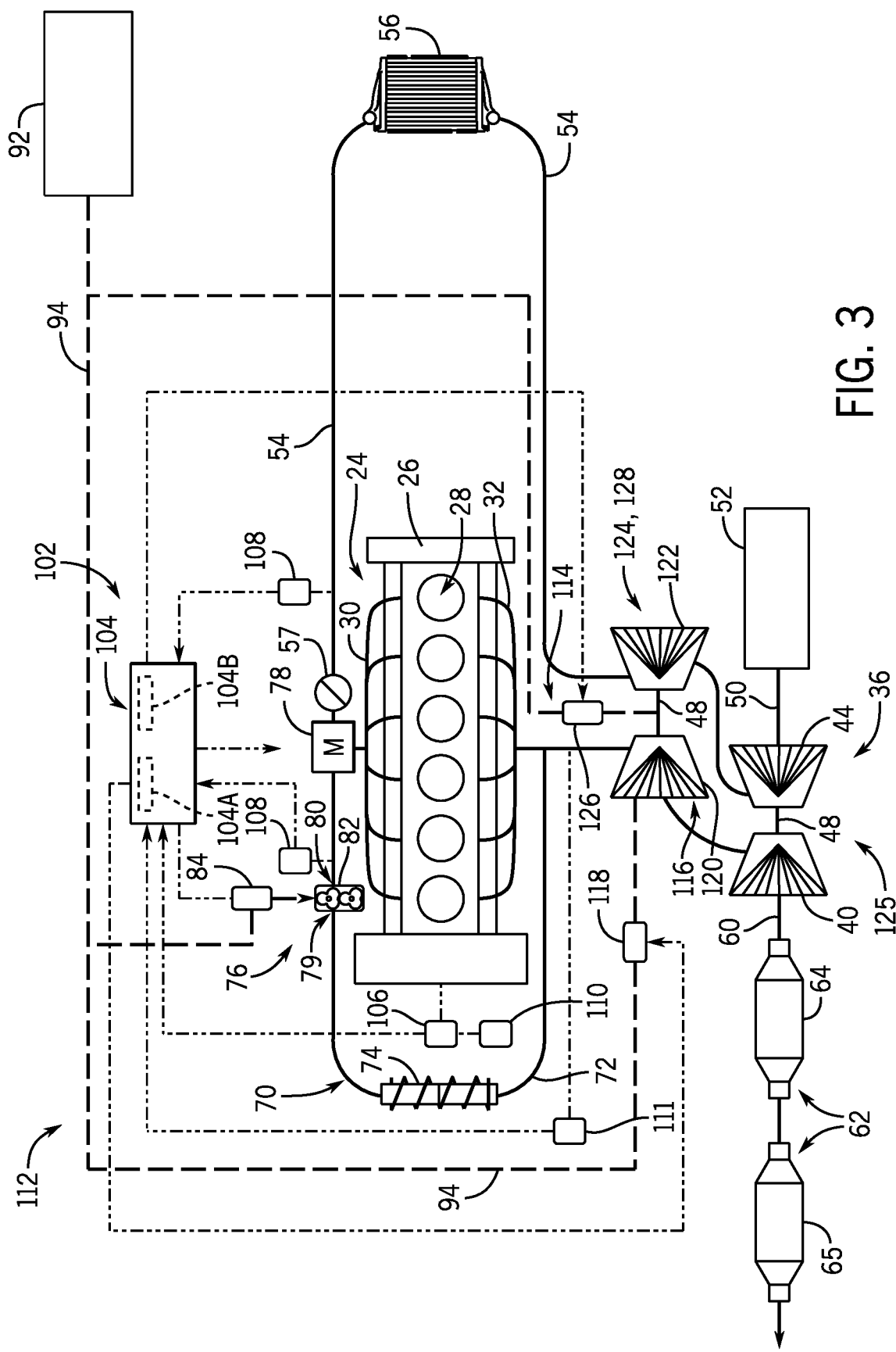
FIG. 3 is a schematic diagram of an example engine system having electrified air system components for managing NOx emissions in accordance with another embodiment.
Figure 4:
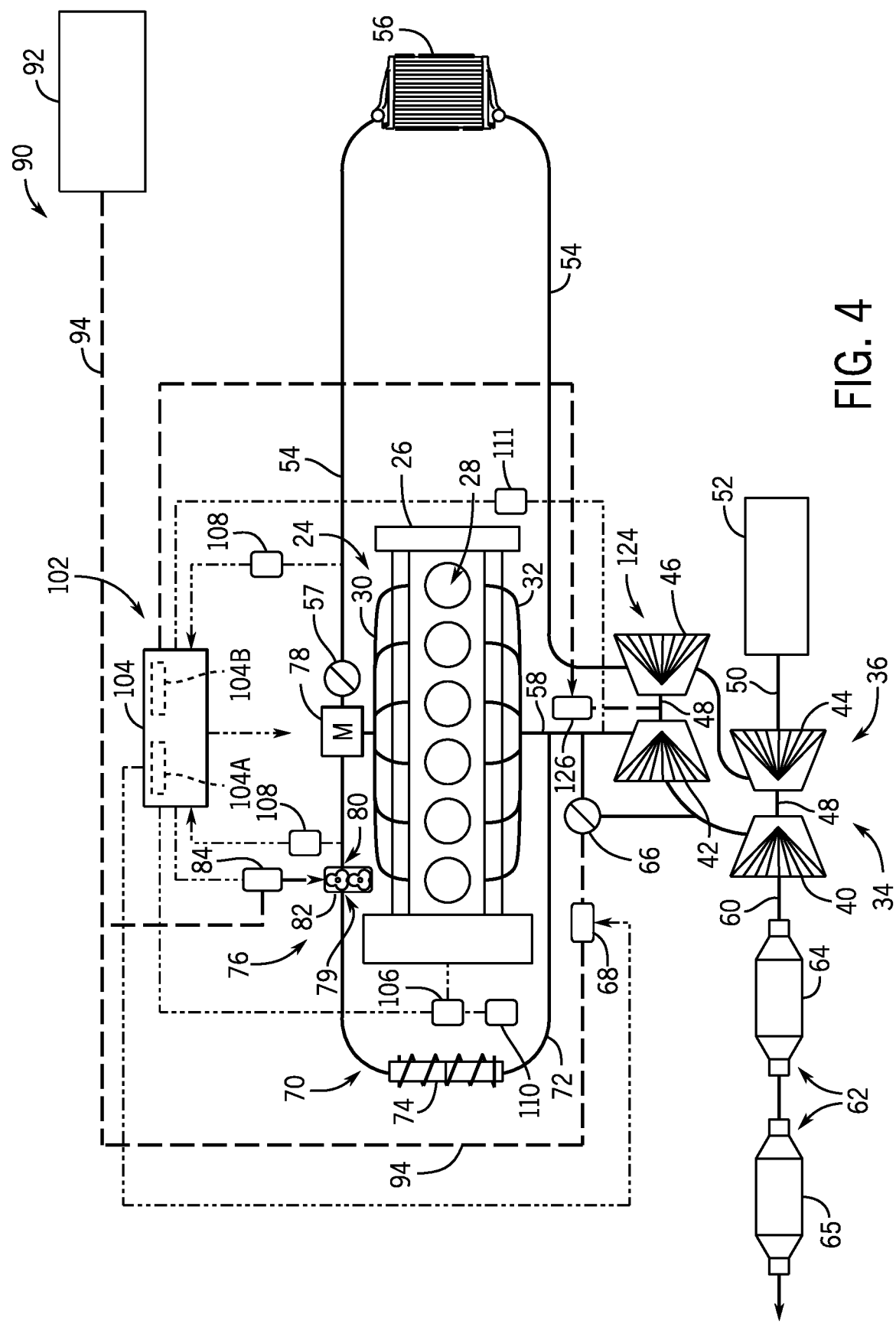
FIG. 4 is a schematic diagram of an example engine system having electrified air system components for managing NOx emissions in accordance with another embodiment.

Referring now to FIG. 3, an engine system 112 is illustrated according to another embodiment. The engine system 112 includes many common components as the engine system 18 of FIG. 2, and thus common components of the system are identified consistent with those in FIG. 2. However, in the engine system 112, alternative components for modifying the flow of exhaust gas through the turbocharger assembly 34 (instead of the e-wastegate 66 and regulator 68) and an alternative air-booster 114 (instead of the e-compressor 86) are provided.

In the illustrated embodiment, the components for modifying the flow of exhaust gas through the turbocharger assembly 34 are provided in the form of a variable geometry (VG) turbocharger 116 (i.e., "VG turbocharger") and associated regulator 118 that are selectively operable to modify the flow of exhaust gas through the VG turbocharger 116. The VG turbocharger 116 may replace the HP turbocharger 38 included in the turbocharger assembly 34 (FIG. 2) or, put differently, the HP turbocharger 38 included in the turbocharger assembly 34 may be modified/constructed such that it is in the form of a VG turbocharger 116 instead of a standard turbocharger that does not have a variable geometry. The VG turbocharger 116 is configured such that the aspect ratio of the turbine 120 (a HP turbine) therein may be altered, which changes the flow area thereof (i.e., modifies the flow of gas exhaust gas therethrough) to vary the amount of energy that the turbine extracts from the exhaust gas, thereby also varying the level at which the associated compressor 122 (a HP compressor) is driven. According to embodiments, the aspect ratio of the turbine 120 may be modified by any of a number of suitable means, including (for example) changing the effective width of vanes in the turbine, such as by moving the turbine 120 along its axis to partially retract the vanes within the turbine housing. The regulator 118 may be configured to alter the aspect ratio of the turbine 120 by moving or actuating components therein, such as moving the turbine 120 along its axis to modify the vane width, and thus the regulator 118 may be provided as a servo motor or other actuator, in one example, that is selectively operable to provide for such movement/actuation.

Also, the air-booster 114 provided in the engine system 112 is provided in the form of an electric turbocharger 124 (hereafter "e-turbocharger") that functions to boost the amount of intake or charge air provided to the engine 24. In the illustrated embodiment, the VG turbocharger 116 is further modified so as to be in the form of an e-turbocharger 124, thereby providing a VG e-turbocharger 128, although it is recognized that an e-turbocharger 124 could be provided in the engine system 112 that is not a VG turbocharger. Additionally, in the illustrated example, the e-turbocharger 124 functions as an HP turbocharger in a turbocharger assembly 125 of the engine system 112, although it is recognized that during operation of the engine system 112, it can occur that the e-turbocharger 124 may be operated while the LP turbocharger 36 is not in operation.

As distinguished from the HP turbocharger 38 in FIG. 2, the e-turbocharger 124 further includes an electrical machine 126 (i.e., electric motor) mechanically coupled to the shaft 48 to selectively provide rotation thereto, such as during periods where sufficient exhaust is not present to drive the turbine 120 and, in turn, the shaft 48 and compressor 122 and/or when additional power for driving the shaft 48 is desired. The e-turbocharger 124 may receive electrical power from the electrical system 90 of the engine system 112, with power from the energy storage device 92 provided to the e-turbocharger 124 via the DC bus 94. When activated, the electrical machine 126 receives an input power and, responsive thereto, drives the shaft 48 and, in turn, the compressor 122 to provide a boosted flow of charge air to the engine 24.

As previously described with respect to the embodiment of FIG. 2, the controller 104 is configured to control operation of the engine system 112 in different operational modes, including in an emissions control mode of operation when the controller 104 determines or identifies that NOx emissions may be reaching a proscribed level (i.e., above an acceptable emissions level), with the controller 104 receiving inputs on the engine load (as determined by air flow and fuel requested/required, for example) and rate of change of the engine load, the exhaust gas temperature, and the engine speed to determine whether the NOx emissions may be at a proscribed level in the current operating condition of the engine system 112.

When it is determined by the controller 104 that the engine load and the exhaust gas temperature values have fallen below respective pre-determined engine load and exhaust gas temperature thresholds (or that a rate of change of the engine load (dropping) is such that the engine load falling below the engine load threshold is imminent), the controller 104 causes the engine system 112 to operate in emissions control mode to manage NOx emissions. In the emissions control mode of operation at a low load, the controller 104 causes power to be provided from the energy storage device 92 to the regulator 118 (such as via the DC bus 94), with the regulator 118 then modifying the aspect ratio of the turbine in the VG turbocharger 116 (i.e., of the turbine 120) to reduce the amount of energy extracted from the exhaust gas by the turbine 120. This allows for the exhaust gas to retain more thermal energy, such that the exhaust gas subsequently passes to the aftertreatment system 62 (i.e., to the SCR device 65) at a higher temperature that enables the SCR device 65 to perform NOx treatment at a higher conversion efficiency. Additionally, by reducing the extraction of energy from the exhaust gas by the turbine 120, the power for driving the compressor 122 is lowered, such that the compressor 122 outputs less charge air to the intake manifold 30. This results in a lower air/fuel ratio in the engine 24, which also serves to lower the level of NOx emissions generated by the engine system 112.

Also, the controller 104 can selectively control power provided from the energy storage device 92 to the EGR pump 76 (such as via the DC bus 94) to provide for EGR in the engine system 112. When the EGR pump 76 is activated (e.g., the electric motor 84 spins the rotors 82), the EGR pump 76 recirculates exhaust gas from the exhaust manifold 32 to the intake manifold 30 after mixing with charge air, such as may be performed in EGR mixer 78. This mixing of recirculated exhaust gas with the charge air also serves to lower the level of NOx emissions generated by the engine system 112, both during low speed operation of the engine 24 and at higher operating speeds as well.

The air-booster 114 is also selectively operated by the controller 104 and can be tied to alteration of the aspect ratio of the turbine in the VG turbocharger 116, in one implementation. That is, the controller 104 may determine that a rate of change of the engine load is increasing at such a level that necessitates activation of the air-booster 114. When the engine 24 is increasing quickly from a low load condition to a high load condition during transient operation, the controller 104 causes the engine system 112 to exit out of the emissions control mode, with the controller 104 (and regulator 118) causing the aspect ratio of the turbine 120 in the VG turbocharger 116 to change so as to extract more energy from the exhaust gas. At the same time, the controller 104 causes power to be provided from the energy storage device 92 to the e-turbocharger 124, such that the electrical machine 126 receives power (from the DC bus 94, for example) and drives the shaft 48 and compressor 122 accordingly, thereby boosting the amount of charge air provided to the engine 24 and providing a corresponding boost in torque output by the engine 24 (when accompanied by an increased fuel flow provided to the engine 24) to meet the increased load.

Figure 5:
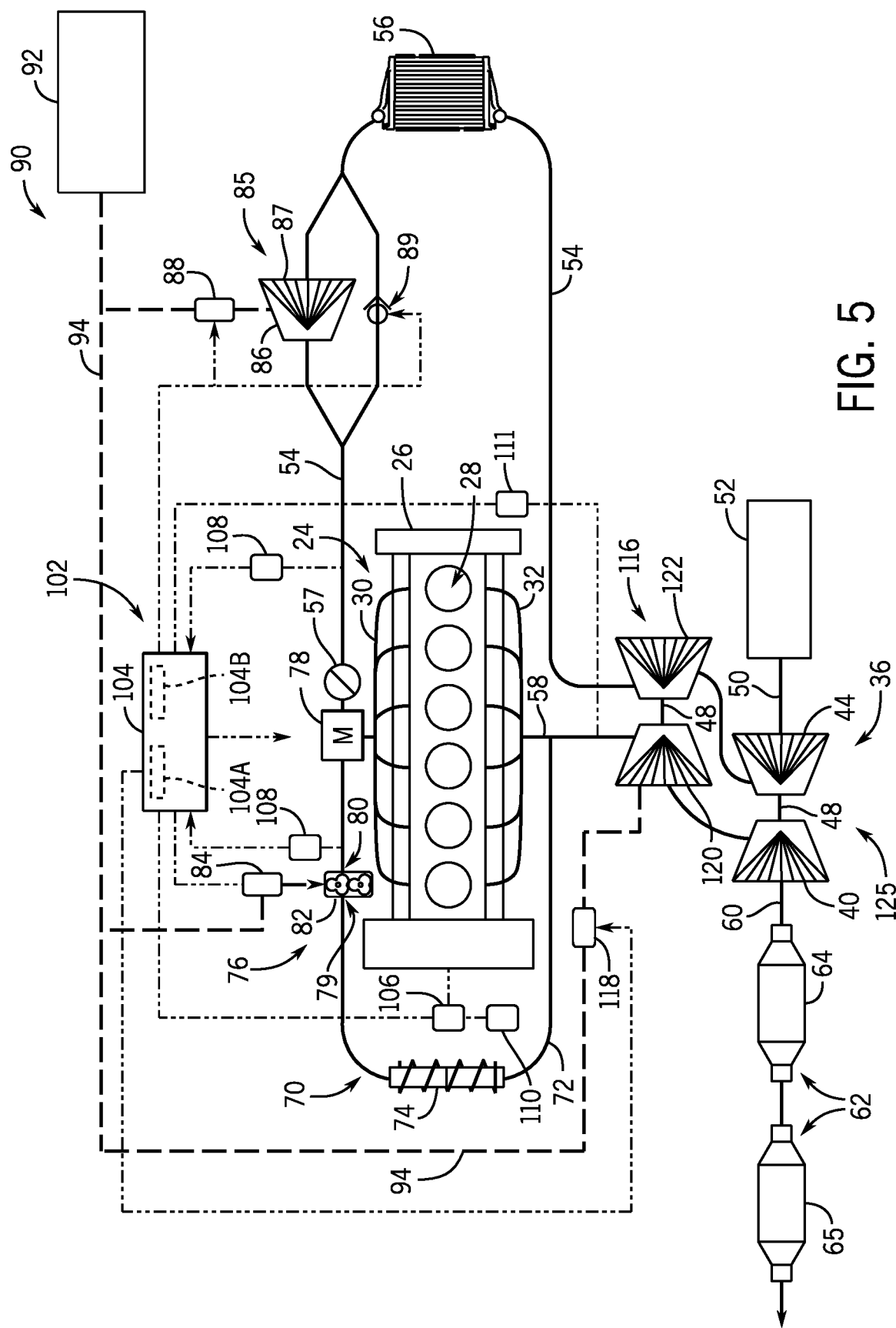
FIG. 5 is a schematic diagram of an example engine system having electrified air system components for managing NOx emissions in accordance with another embodiment.
Figure 6:
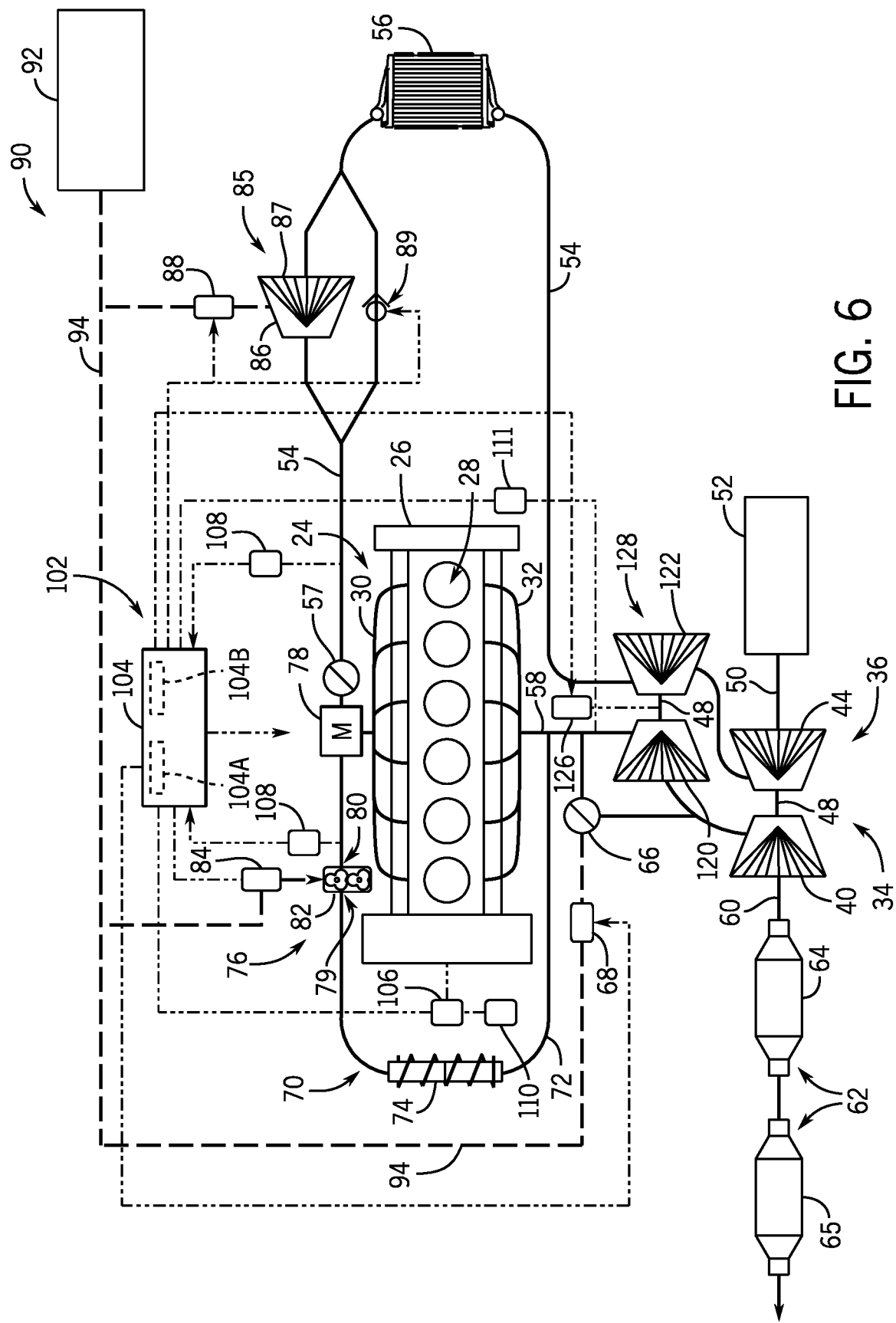
FIG. 6 is a schematic diagram of an example engine system having electrified air system components for managing NOx emissions in accordance with another embodiment.

While the engine systems 18, 112 illustrated in FIGS. 2 and 3 are shown as including a specified combination of components for modifying the flow of exhaust gas through the turbocharger assembly 34, 125 and air-booster components, it is recognized that engine systems could be provided with different combinations of components. For example, an engine system could be provided that includes an e-wastegate 66 for modifying the flow of exhaust gas through the turbocharger assembly 34 in combination with an e-turbocharger 124 for boosting charge air to the intake manifold 30 (FIG. 4) or an engine system could be provided that includes a VG turbocharger 116 for modifying the flow of exhaust gas through the turbocharger assembly 125 in combination with an e-compressor 86 for boosting charge air to the intake manifold 30 (FIG. 5). In still another implementation, an engine system may be provided that includes an e-wastegate 66, an e-compressor 86, and a VG e-turbocharger 128 (FIG. 6).

Figure 7:
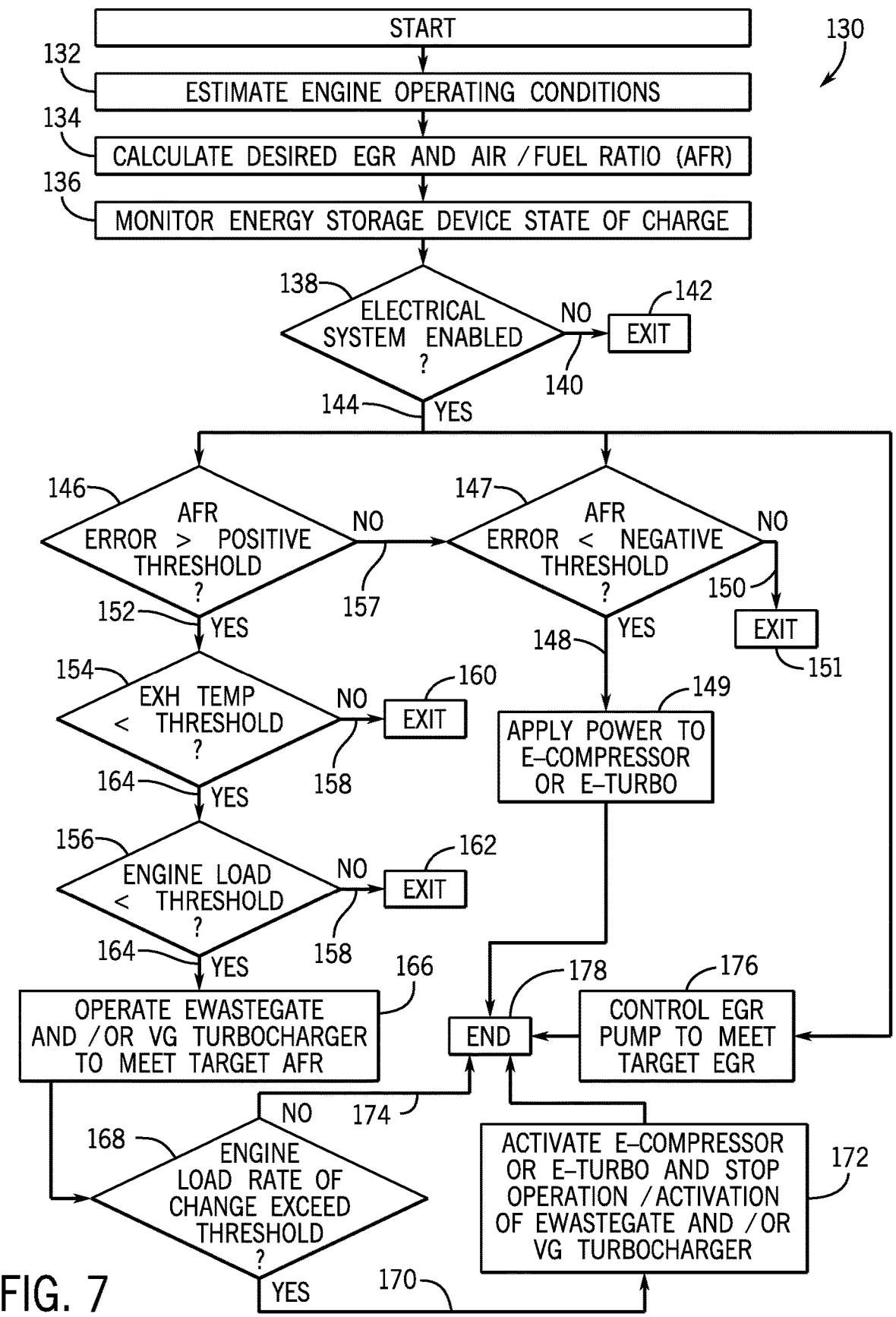
FIG. 7 is a flowchart of an example method of operating an engine system having electrified air system components for managing NOx emissions.

Referring now to FIG. 7, and with continued reference to FIGS. 1-6, a flowchart of a method 130 for operating the engine system 18, 112 is provided in accordance with the present disclosure, such as may be performed by the controller 104. Generally, the method 130 is implemented during operation of the work vehicle 10. As will be explained in detail below, the method 130 implements a control strategy for selectively operating electrified air system components in the engine system 18, 112 to manage the level of tailpipe NOx emissions.

The method 130 begins at step 132 with a determination of the engine system operating conditions. The determination of the engine system operating conditions may be determined based on an ongoing monitoring and analysis of various operational parameters of the engine system 18, 112, which may include: engine speed; engine load; engine load rate of change; mass airflow, temperature, and pressure in intake/charge or exhaust gas; fuel flow; exhaust gas temperature; and/or estimated NOx levels, for example. Based on the determined engine mode of operation, and as part of step 132, the controller 104 may operate to output command and control signals that are transmitted to and received by components of the engine system 18, 112 that cause the engine system to operate in an appropriate mode of operation (e.g., engine start-up mode, engine stop/start mode, cold engine mode, boost mode, or engine emissions control mode), with such command and control signals being provided to the engine 24, the EGR pump 76, the e-compressor 86 or e-turbocharger 124, and the air-booster 85, 114, as non-limiting examples.

During ongoing operation of the engine system 18, 112 in a determined mode, the method 130 continues at step 134, where a calculation is performed of desired values/levels of exhaust gas recirculation (EGR) and an air/fuel ratio that are appropriate for the determined operational mode. Again, the engine system operating mode may be determined based on an ongoing monitoring and analysis of engine speed; engine load; and mass airflow, temperature, and pressure in intake/charge or exhaust gas; fuel flow; and/or exhaust gas temperature, for example, along with demands placed on the engine system 18, 112 responsive to operator commands. Based on the current operating mode, appropriate values/levels of EGR and an appropriate an air/fuel ratio are calculated that provide for operation in that mode.

During ongoing monitoring and analysis of the operational parameters of the engine system 18, 112, and along with calculating the desired values/levels of EGR and air/fuel ratio, the method 130 also monitors the state-of-charge of the energy storage device 92, as indicated at step 136. Based on this monitoring of the energy storage device state-of-charge, a determination is made at step 138 as to whether the electrical system 90 in the engine system 18, 112 is enabled. If it is determined at step 138 that the electrical system 90 is not enabled, such as based on the energy storage device 92 not being at a sufficient state-of-charge, as indicated at 140, then the method 130 continues to step 142, where the control scheme is exited and the method 130 restarts. Alternatively, if it is determined at step 138 that the electrical system 90 is enabled, such as based on the energy storage device 92 being at a sufficient state-of-charge, as indicated at 144, then the method 130 continues by proceeding along a number of parallel operational paths.

Along two operational paths of the continued method 130, comparisons are performed between the air/fuel ratio and associated positive and negative air/fuel ratio thresholds, as indicated at steps 146 and 147. More specifically, a difference between an actual air/fuel ratio and the desired air/fuel ratio (i.e., an "AFR error") is compared to positive and negative AFR error thresholds at steps 146 and 147—with step 146 determining whether the AFR error is greater than the positive AFR error threshold and step 147 determining whether the AFR error is less than the negative AFR error threshold. In performing steps 146 and 147, the controller 104 first calculates the AFR error by comparing an actual air/fuel ratio to the desired air/fuel ratio. The actual air/fuel ratio may be determined by the controller 104 based on inputs received from the fuel sensor 110 and the sensor(s) 108 (that measure mass airflow and/or pressure in the intake manifold 30 or charge air passageway 54, for example). Upon calculation of the AFR error, the controller 104 can then compare the AFR error to pre-determined positive and negative AFR error thresholds that may be stored in the memory 104b, for example, to determine whether the AFR error is within an acceptable error band within which the electrified air system components in the engine system 18, 112 can work inside.

Regarding step 147, if it is determined at step 147 that the AFR error is less than the negative AFR error threshold, as indicated at 148, then the method 130 continues to step 149, where power is applied to the air-booster 85, 114 (i.e., to the e-compressor 86 or the e-turbocharger 124, as described in detail above) to activate the system. That is, when the AFR error is less than the negative AFR error threshold, it is determined that the AFR error is not within an acceptable error band and that the need for managing NOx emissions via modifying the flow of exhaust gas to/through the turbocharger assembly 34, 125 (which can result in a decrease in the amount of charge air provided to the engine 24) is therefore low. This may occur when the engine 24 is operating above a pre-determined minimum engine load threshold and/or when the engine load is increasing at a high rate (above an associated rate of change threshold). In such cases, the controller 104 operates to cause power to be applied to the air-booster 85, 114, so that boosted charge air is provided to the intake manifold 30. Alternatively, if it is instead determined at step 147 that the AFR error is not less (i.e., is greater) than the negative AFR error threshold, as indicated at 150, then the method 130 continues to step 151 where the control scheme is exited and the method 130 restarts.

Regarding step 146, if it is determined at step 146 that the AFR error is greater than the positive AFR error threshold so as to not be within an acceptable error band, as indicated at 152, then the method 130 continues to steps 154 and 156, where determinations are next made regarding whether the exhaust gas temperature is below a pre-determined exhaust gas temperature threshold (step 154) and whether the engine load is below a pre-determined engine load threshold (step 156). In determining whether the exhaust gas temperature and engine load are below pre-determined exhaust gas temperature and engine load thresholds, respectively, the controller 104 may receive inputs from the exhaust gas temperature sensor 111 and the sensor(s) 108, 110 (the controller 104 may determine/calculate the engine load based on an air flow and fuel flow, as measured by sensors 108, 110), with the measured exhaust gas temperature and determined engine load being compared to the respective thresholds that may be stored in the memory 104b, for example. Alternatively, if it is instead determined at step 146 that the AFR error is not greater (i.e., is less) than the positive AFR error threshold, as indicated at 157, then the method 130 continues to step 159 where the control scheme is exited and the method 130 restarts.

For steps 154 and 156 it is determined that the exhaust gas temperature is above the exhaust gas temperature threshold (step 154) or that the engine load is above the engine load threshold (step 156), as indicated at 158, then the method 130 continues to step 160 or step 162, where the control scheme is exited and the method 130 restarts. Alternatively, if it is determined at steps 154 and 156 that the exhaust gas temperature is below the exhaust gas temperature threshold (step 154) and also that the engine load is below the engine load threshold (step 156), as indicated at 164, then the method 130 continues to step 166, where the controller 104 operates to cause the flow of exhaust gas through the turbocharger assembly 34, 125 (i.e., the HP turbine 42, 120) to be modified in a manner that results in less energy being extracted from the exhaust gas.

In one embodiment at step 166, the controller 104 causes power to be applied to the e-wastegate 66 (as controlled via regulator 68), so that the e-wastegate 66 is actuated to an open position (to a fully open or substantially open position). Upon opening the e-wastegate 66, the flow of exhaust gas to the HP turbine 42 is modified—with the exhaust gas flowing through the e-wastegate 66 and bypassing the HP turbine 42 when the e-wastegate 66 is operated in an open (or substantially open) condition. In bypassing the HP turbine 42, the amount of energy extracted from the exhaust gas by the HP turbine is reduced (or eliminated), which allows for the exhaust gas to retain more thermal energy (so as to enable the SCR device 65 to perform NOx treatment at a higher conversion efficiency) and which reduces the power that drives the HP compressor 46 (such that the compressor 46 outputs less charge air to the intake manifold 30, resulting in a lower air/fuel ratio in the engine).

In another embodiment at step 166, the controller 104 causes power to be applied to the regulator 118 to vary the aspect ratio of the HP turbine 120 in a VG turbocharger 116, with the regulator 118 altering the aspect ratio of the HP turbine 120 by moving or actuating components therein, such as moving the HP turbine 120 along its axis to modify the vane width. By varying the aspect ratio of the HP turbine 120, the amount of energy extracted from the exhaust gas by the turbine is reduced, which allows for the exhaust gas to retain more thermal energy (so as to enable the SCR device to perform NOx treatment at a higher conversion efficiency) and which reduces the power that drives the compressor 122 (such that the compressor 122 outputs less charge air to the intake manifold 30, resulting in a lower air/fuel ratio in the engine 24).

By modifying (reducing) the flow of exhaust gas through the turbocharger assembly 34, 125 (i.e., the HP turbine 42, 120) at step 166, the air/fuel ratio in the engine 24 can be reduced. The controller 104 may control the e-wastegate 66 or VG turbocharger 116 to continue modifying the flow of exhaust gas through the turbocharger assembly 34, 125 until it is determined (by continued sensor inputs to the controller 104) that the air/fuel ratio meets a target value. With the air/fuel ratio at a target level, the amount of excess air present during combustion is reduced, reducing the level of NOx emissions output from the engine 24.

After causing the flow of exhaust gas through the turbocharger assembly 34, 125 to be modified at step 166, the method 130 may continue by monitoring a rate of change of the engine load. In monitoring the engine load rate of change, a determination is made at step 168 of whether the engine load rate of change exceeds an engine load rate of change threshold, as it is recognized that a sharp increase in the engine load rate of change would require a quick transient response in the engine 24 (via a boost in intake air provided to the engine 24) to meet the increased load. If it is determined at step 168 that the engine load rate of change exceeds the engine load rate of change threshold, as indicated at 170, then the method continues to step 172 where the electrified air-booster 85, 114 (i.e., the e-compressor 86 or the e-turbocharger 124, as described in detail above) is activated, so that boosted charge air is provided to the intake manifold 30. Also at step 172, upon the electrified air-booster 85, 114 being activated, the controller 104 operates to stop the modification of the flow of exhaust gas through the turbocharger assembly 34, 125 (i.e., the HP turbine 42, 120), such as via actuation of the e-wastegate 66 or the VG turbocharger 116. If it is instead determined at step 168 that the engine load rate of change does not exceed the engine load rate of change threshold, as indicated at 174, then the method 130 continues on—with the controller 104 continuing to operate to modify the flow of exhaust gas through the turbocharger assembly 34, 125 (i.e., the HP turbine 42, 120) via selective operation of the e-wastegate 66 or the VG turbocharger 116.

Referring again now to the progression of the method 130 after the determination performed at step 138, and now along the other operational path of the continued method 130, controlling of the EGR pump 76 is performed at step 176. As previously indicated, a calculation is performed at step 134 regarding a level of EGR that is desired for a present operational mode of the engine system 18, 112—with the operational mode determined based on an ongoing monitoring and analysis of various engine system operational parameters, including monitoring of the engine speed. At step 176, the controller 104 operates the EGR pump 76 at a desired level so as to meet a target level of EGR, such as controlling the power provided to the electric motor 84 for rotating rotors 82 in the EGR pump 76, for example. The EGR pump 76 is thus operated in a controlled manner to recirculate exhaust gas from the exhaust manifold 32 to the intake manifold 30 after mixing with charge air, with this mixing of recirculated exhaust gas with the charge air serving to lower the level of NOx emissions generated by the engine system 18, 112. Beneficially, the EGR pump 76 may be operated even with the engine 24 running at low speed, such that recirculation of exhaust gas and associated managing of NOx emissions may be provided over a wide range of engine system operating conditions.

Upon the completion of step 149 or 166/172, along with step 176, the method 130 may then end, as indicated at step 178, with it understood that the method 130 is repeated during ongoing operation of the engine system 18, 112 to continually manage NOx emissions therefrom. Beneficially, the performing of the method 130, and the structure of the engine system 18, 112 which operates according to this method, allow for the management of NOx emissions from the engine system 18, 112 across a wide range of operating conditions, including operation at low loads and low speeds. The NTE region within which NOx emissions are managed is thus expanded as compared to existing engine systems, which will allow the engine system 18, 112 of the disclosed invention to meet more stringent future NOx emissions standards. Electrified air system components in the engine system 12, 118 are selectively operable to better manage NOx emissions, with operation of the air system components controlling EGR and improving SCR conversion efficiency, especially during low speed and low load engine operating conditions, such that NOx emissions can be reduced over an expanded NTE region. Depending on the drive cycle, the engine system 12, 118 may provide for a $10x$ reduction in NOx emissions as compared to existing engine systems, such as a reduction from 0.4 g/kW-hr to 0.04 g/kW-hr.

Enumerated Examples

The following examples are provided, which are numbered for ease of reference.

1. An engine system includes an engine having one or more piston-cylinder arrangements communicating with an intake manifold and an exhaust manifold, a turbocharger including a turbine in communication with the exhaust manifold and a compressor driven by the turbine and in communication with the intake manifold, and a regulator configured to control a flow of exhaust gas through the turbine. The engine system also includes a controller having a processor and memory architecture and that is operably connected with the regulator, the controller configured to monitor an engine load and an exhaust gas temperature during operation of the engine, identify a proscribed engine nitrogen oxides (NOx) emissions level based on the engine load and the exhaust gas temperature in which NOx emissions are within a proscribed range, and when the proscribed engine NOx emissions level is identified, control the regulator to modify the flow of exhaust gas through the turbine. Modifying the flow of exhaust gas through the turbine reduces an amount of energy extracted from the exhaust gas by the turbine and reduces a drive power provided to the compressor, thereby reducing a flow of intake air provided to the intake manifold by the compressor.

2. The engine system of example 1, wherein the controller is configured to determine a desired air/fuel ratio for operation of the engine, determine whether a current air/fuel ratio matches the desired air/fuel ratio and, when the current air/fuel ratio does not match the desired air/fuel ratio, or is not within a pre-determined range relative to the desired air/fuel ratio, modify the flow of exhaust gas through the turbine, so as to reduce the air/fuel ratio for operation of the engine.

3. The engine system of example 1, wherein the controller is configured to compare the engine load and the exhaust gas temperature to associated engine load and exhaust gas temperature thresholds, respectively, identify the proscribed engine NOx emissions level when both the engine load and the exhaust gas temperature are below the associated engine load and exhaust gas temperature thresholds, and control the regulator to modify the flow of exhaust gas through the turbine, to reduce the amount of energy extracted from the exhaust gas by the turbine and reduce the drive power provided to the compressor, until the exhaust gas temperature reaches a target temperature.

4. The engine system of example 1, wherein the turbocharger comprises a variable geometry (VG) turbocharger where the turbine has an adjustable aspect ratio that controls the amount of energy extracted from the exhaust gas as the exhaust gas passes therethrough, and wherein the regulator is configured to adjust positioning of one or more components in the turbine to adjust the aspect ratio.

5. The engine system of claim 1, further comprising an electrified wastegate operable between an open position and a closed position to cause the flow of exhaust gas to pass through the turbine or to bypass the turbine, and wherein the regulator is configured to actuate the electrified wastegate between the open position and the closed position.

6. The engine system of example 5, wherein the turbocharger is a high pressure (HP) turbocharger and the turbine and the compressor are a HP turbine and a HP compressor, with the electrified wastegate operable between the open position and the closed position to cause the flow of exhaust gas to pass through the HP turbine or to bypass the HP turbine, and wherein the engine system further includes a low pressure (LP) turbocharger having a LP turbine and a LP compressor and another electrified wastegate operable between an open position and a closed position to cause the flow of exhaust gas to pass through the LP turbine or to bypass the LP turbine, and wherein the regulator is configured to actuate the another electrified wastegate between the open position and the closed position.

7. The engine system of example 1, wherein in monitoring the engine load, the controller is configured to monitor each of an engine load level and an engine load rate of change, and wherein the controller is further configured to monitor an engine speed of the engine.

8. The engine system of example 7, further comprising an electrified air-booster configured to boost intake air to the intake manifold when activated.

9. The engine system of example 8, wherein the electrified air-booster comprises an e-compressor including a stand-alone compressor and an electrical machine that drives the stand-alone compressor to boost intake air to the intake manifold.

10. The engine system of example 8, wherein the electrified air-booster comprises an electrical machine mechanically coupled to the turbocharger to drive a shaft that couples the turbine and the compressor, with the turbocharger thus comprising an e-turbocharger that boosts intake air to the intake manifold.

11. The engine system of example 8, wherein the controller is configured to identify when the engine load rate of change exceeds an engine load rate of change threshold, activate the electrified air-booster when the engine load rate of change exceeds the engine load rate of change threshold and, upon the electrified air-booster being activated, control the regulator to stop the modification to the flow of exhaust gas through the turbine.

12. The engine system of example 1, further comprising an exhaust gas recirculation (EGR) pump operable to recirculate a portion of exhaust gas output from the exhaust manifold back to the intake manifold, wherein the EGR pump is operable in combination with the controller modifying the flow of exhaust gas through the turbine to further reduce NOx emissions from the engine system.

13. An engine system for a work vehicle includes an engine having one or more piston-cylinder arrangements communicating with an intake manifold and an exhaust manifold, a turbocharger including a turbine in communication with the exhaust manifold and a compressor driven by the turbine and in communication with the intake manifold, and a regulator configured to control a flow of exhaust gas through the turbine. The engine system also includes a controller having a processor and memory architecture and that is operably connected with the regulator, the controller configured to monitor an engine load and an exhaust gas temperature during operation of the engine, determine if the engine load and the exhaust gas temperature are below an engine load threshold and exhaust gas temperature threshold, respectively, thereby indicating a proscribed engine nitrogen oxides (NOx) emissions level, and when the engine load and the exhaust gas temperature are below the engine load and exhaust gas temperature thresholds, control the regulator to modify the flow of exhaust gas through the turbine. Modifying the flow of exhaust gas through the turbine reduces an amount of energy extracted from the exhaust gas by the turbine and reduces a drive power provided to the compressor, thereby reducing a flow of intake air provided to the intake manifold by the compressor.

14. The engine system of example 13, wherein the turbocharger comprises a variable geometry (VG) turbocharger where the turbine has an adjustable aspect ratio that controls the amount of energy extracted from the exhaust gas as the exhaust gas passes therethrough, and wherein the regulator is configured to adjust positioning of one or more components in the turbine to adjust the aspect ratio.

15. The engine system of example 13, further comprising an electrified wastegate operable between an open position and a closed position to cause the flow of exhaust gas to pass through the turbine or to bypass the turbine, and wherein the regulator is configured to actuate the electrified wastegate between the open position and the closed position.

Conclusion

The foregoing has thus provided an engine system that manages NOx emissions over a broad operating range of the engine, including during low speed and low load engine operating conditions. The engine system is provided with electrified air system components that are selectively operable to both increase exhaust gas recirculation and improve selective catalyst reduction conversion efficiency in the engine system to provide in-cylinder and out-of-cylinder NOx emissions reductions. According to a controller implemented method or control scheme, electrified air system components may be activated when NOx emissions levels are determined to be at a proscribed level, as determined by monitoring air/fuel ratio, engine load, and exhaust gas temperature in the engine system, with the flow of exhaust gas through the turbocharger assembly in the engine system, and through a turbine in the turbocharger assembly, being modified to reduce an amount of energy extracted from the exhaust gas by the turbine and thereby lower NOx emissions from the engine system.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine system comprising:
    an engine having one or more piston-cylinder arrangements communicating with an intake manifold and an exhaust manifold;
    a turbocharger including a turbine in communication with the exhaust manifold and a compressor driven by the turbine and in communication with the intake manifold;
    a regulator configured to control a flow of exhaust gas through the turbine; and
    a controller, including a processor and memory architecture, operably connected with the regulator, the controller configured to:
        monitor an engine load and an exhaust gas temperature during operation of the engine;
        identify a proscribed engine nitrogen oxides (NOx) emissions level based on the engine load and the exhaust gas temperature in which NOx emissions are within a proscribed range; and
        when the proscribed engine NOx emissions level is identified, control the regulator to modify the flow of exhaust gas through the turbine;
    wherein modifying the flow of exhaust gas through the turbine reduces an amount of energy extracted from the exhaust gas by the turbine and reduces a drive power provided to the compressor, thereby reducing a flow of intake air provided to the intake manifold by the compressor.

2. The engine system of claim 1, wherein the controller is configured to:
    determine a desired air/fuel ratio for operation of the engine;
    determine whether a current air/fuel ratio matches the desired air/fuel ratio; and
    when the current air/fuel ratio does not match the desired air/fuel ratio or is not within a pre-determined range relative to the desired air/fuel ratio, modify the flow of exhaust gas through the turbine, so as to reduce the air/fuel ratio for operation of the engine.

3. The engine system of claim 1, wherein the controller is configured to:
    compare the engine load and the exhaust gas temperature to associated engine load and exhaust gas temperature thresholds, respectively;
    identify the proscribed engine NOx emissions level when both the engine load and the exhaust gas temperature are below the associated engine load and exhaust gas temperature thresholds; and
    control the regulator to modify the flow of exhaust gas through the turbine, to reduce the amount of energy extracted from the exhaust gas by the turbine and reduce the drive power provided to the compressor, until the exhaust gas temperature reaches a target temperature.

4. The engine system of claim 1, wherein the turbocharger comprises a variable geometry (VG) turbocharger where the turbine has an adjustable aspect ratio that controls the amount of energy extracted from the exhaust gas as the exhaust gas passes therethrough, and wherein the regulator is configured to adjust positioning of one or more components in the turbine to adjust the aspect ratio.

5. The engine system of claim 1, further comprising an electrified wastegate operable between an open position and a closed position to cause the flow of exhaust gas to pass through the turbine or to bypass the turbine, and wherein the regulator is configured to actuate the electrified wastegate between the open position and the closed position.

6. The engine system of claim 5, wherein the turbocharger comprises a high pressure (HP) turbocharger and the turbine and the compressor comprise a HP turbine and a HP compressor, with the electrified wastegate operable between the open position and the closed position to cause the flow of exhaust gas to pass through the HP turbine or to bypass the HP turbine; and
    wherein the engine system further comprises:
        a low pressure (LP) turbocharger comprising a LP turbine and a LP compressor; and
        another electrified wastegate operable between an open position and a closed position to cause the flow of exhaust gas to pass through the LP turbine or to bypass the LP turbine, and wherein the regulator is configured to actuate the another electrified wastegate between the open position and the closed position.

7. The engine system of claim 1, wherein in monitoring the engine load, the controller is configured to monitor each of an engine load level and an engine load rate of change, and wherein the controller is further configured to monitor an engine speed of the engine.

8. The engine system of claim 7, further comprising an electrified air-booster configured to boost intake air to the intake manifold when activated.

9. The engine system of claim 8, wherein the electrified air-booster comprises an e-compressor including a stand-alone compressor and an electrical machine that drives the stand-alone compressor to boost intake air to the intake manifold.

10. The engine system of claim 8, wherein the electrified air-booster comprises an electrical machine mechanically coupled to the turbocharger to drive a shaft that couples the turbine and the compressor, with the turbocharger thus comprising an e-turbocharger that boosts intake air to the intake manifold.

11. The engine system of claim 8, wherein the controller is configured to:
    identify when the engine load rate of change exceeds an engine load rate of change threshold;
    activate the electrified air-booster when the engine load rate of change exceeds the engine load rate of change threshold; and
    upon the electrified air-booster being activated, control the regulator to stop the modification to the flow of exhaust gas through the turbine.

12. The engine system of claim 8, further comprising an energy storage device included as part of a power system that provides 36 V power or greater in the engine system, wherein the energy storage device provides power at least to the regulator and to the electrified air-booster.

13. The engine system of claim 1, further comprising an exhaust gas recirculation (EGR) pump operable to recirculate a portion of exhaust gas output from the exhaust manifold back to the intake manifold, wherein the EGR pump is operable in combination with the controller modifying the flow of exhaust gas through the turbine to further reduce NOx emissions from the engine system.

14. An engine system for a work vehicle, the engine system comprising:
an engine having one or more piston-cylinder arrangements communicating with an intake manifold and an exhaust manifold;
a turbocharger including a turbine in communication with the exhaust manifold and a compressor driven by the turbine and in communication with the intake manifold;
a regulator configured to control a flow of exhaust gas through the turbine; and
a controller, including a processor and memory architecture, operably connected with the regulator, the controller configured to:
monitor an engine load and an exhaust gas temperature during operation of the engine;
determine if the engine load and the exhaust gas temperature are below an engine load threshold and exhaust gas temperature threshold, respectively, thereby indicating a proscribed engine nitrogen oxides (NOx) emissions level; and
when the engine load and the exhaust gas temperature are below the engine load and exhaust gas temperature thresholds, control the regulator to modify the flow of exhaust gas through the turbine;
wherein modifying the flow of exhaust gas through the turbine reduces an amount of energy extracted from the exhaust gas by the turbine and reduces a drive power provided to the compressor, thereby reducing a flow of intake air provided to the intake manifold by the compressor.

15. The engine system of claim 14, wherein the controller is configured to:
determine a desired air/fuel ratio for operation of the engine;
determine whether a current air/fuel ratio matches the desired air/fuel ratio; and
when the current air/fuel ratio does not match the desired air/fuel ratio or is not within a pre-determined range relative to the desired air/fuel ratio, subsequently perform the determinations of whether the engine load and the exhaust gas temperature are below the engine load threshold and the exhaust gas temperature threshold, respectively.

16. The engine system of claim 14, wherein the turbocharger comprises a variable geometry (VG) turbocharger where the turbine has an adjustable aspect ratio that controls the amount of energy extracted from the exhaust gas as the exhaust gas passes therethrough, and wherein the regulator is configured to adjust positioning of one or more components in the turbine to adjust the aspect ratio.

17. The engine system of claim 14, further comprising an electrified wastegate operable between an open position and a closed position to cause the flow of exhaust gas to pass through the turbine or to bypass the turbine, and wherein the regulator is configured to actuate the electrified wastegate between the open position and the closed position.

18. The engine system of claim 14, further comprising:
an electrified air-booster configured to boost intake air to the intake manifold when activated; and
an exhaust gas recirculation (EGR) pump operable to recirculate a portion of exhaust gas output from the exhaust manifold back to the intake manifold.

19. The engine system of claim 18, wherein the electrified air-booster comprises one of:
an e-compressor including a stand-alone compressor and an electrical machine that drives the stand-alone compressor to boost intake air to the intake manifold; or
an electrical machine mechanically coupled to the turbocharger to drive a shaft that couples the turbine and the compressor, with the turbocharger thus comprising an e-turbocharger that boosts intake air to the intake manifold.

20. The engine system of claim 18, wherein in monitoring the engine load, the controller is configured to monitor each of an engine load level and an engine load rate of change, and wherein the controller is further configured to:
identify when the engine load rate of change exceeds an engine load rate of change threshold;
activate the electrified air-booster when the engine load rate of change exceeds the engine load rate of change threshold; and
upon the electrified air-booster being activated, control the regulator to stop the modification to the flow of exhaust gas through the turbine.

\* \* \* \* \*